United States Patent
Thijssen et al.

[11] Patent Number: 6,080,951
[45] Date of Patent: Jun. 27, 2000

[54] METHOD AND DEVICE FOR IMPROVING THE TRANSPLANTING OF SEEDLINGS

[75] Inventors: Bert Thijssen, Venlo, Netherlands; Leo Lehto, Köyliö; Altti Keskilohko, Säkylä, both of Finland

[73] Assignee: Lännen Tehtaat Oy, Iso-Vimma, Finland

[21] Appl. No.: 09/177,052

[22] Filed: Oct. 23, 1998

[30] Foreign Application Priority Data

Oct. 24, 1997 [FI] Finland ................................. 974041

[51] Int. Cl.⁷ ................................................ B07C 5/00
[52] U.S. Cl. ..................... 209/577; 209/576; 111/104; 111/105
[58] Field of Search ................................. 209/576, 577, 209/587; 111/105, 104, 110

[56] References Cited

U.S. PATENT DOCUMENTS

| 4,215,513 | 8/1980 | Dedolph . |
| 4,893,571 | 1/1990 | Häkli et al. . |
| 5,676,072 | 10/1997 | Williames . |

FOREIGN PATENT DOCUMENTS

| 0457405A2 | 11/1991 | European Pat. Off. . |
| 4-293407 | 10/1992 | Japan . |
| 7-059414 | 3/1995 | Japan . |
| 7-079623 | 3/1995 | Japan . |
| 08103112 | 4/1996 | Japan . |
| 08112012 | 5/1996 | Japan . |
| 2124872 | 2/1984 | United Kingdom . |
| WO98/28965 | 7/1998 | WIPO . |

Primary Examiner—Donald P. Walsh
Assistant Examiner—Jonathan R Miller
Attorney, Agent, or Firm—Burns, Doane, Swecker & Mathis, L.L.P.

[57] ABSTRACT

A method and device for improving the efficiency of mechanical transplanting, wherein seedling balls carrying no seedlings or undersize seedlings are automatically removed prior to the planting stage. Several seedling balls are simultaneously extracted from a common cultivation tray and deficient balls are detected and removed. The deficit caused by a removed seedling ball is compensated by momentarily increasing the rate of feeding balls from the tray. No separate replacement seedling supply is required.

18 Claims, 4 Drawing Sheets

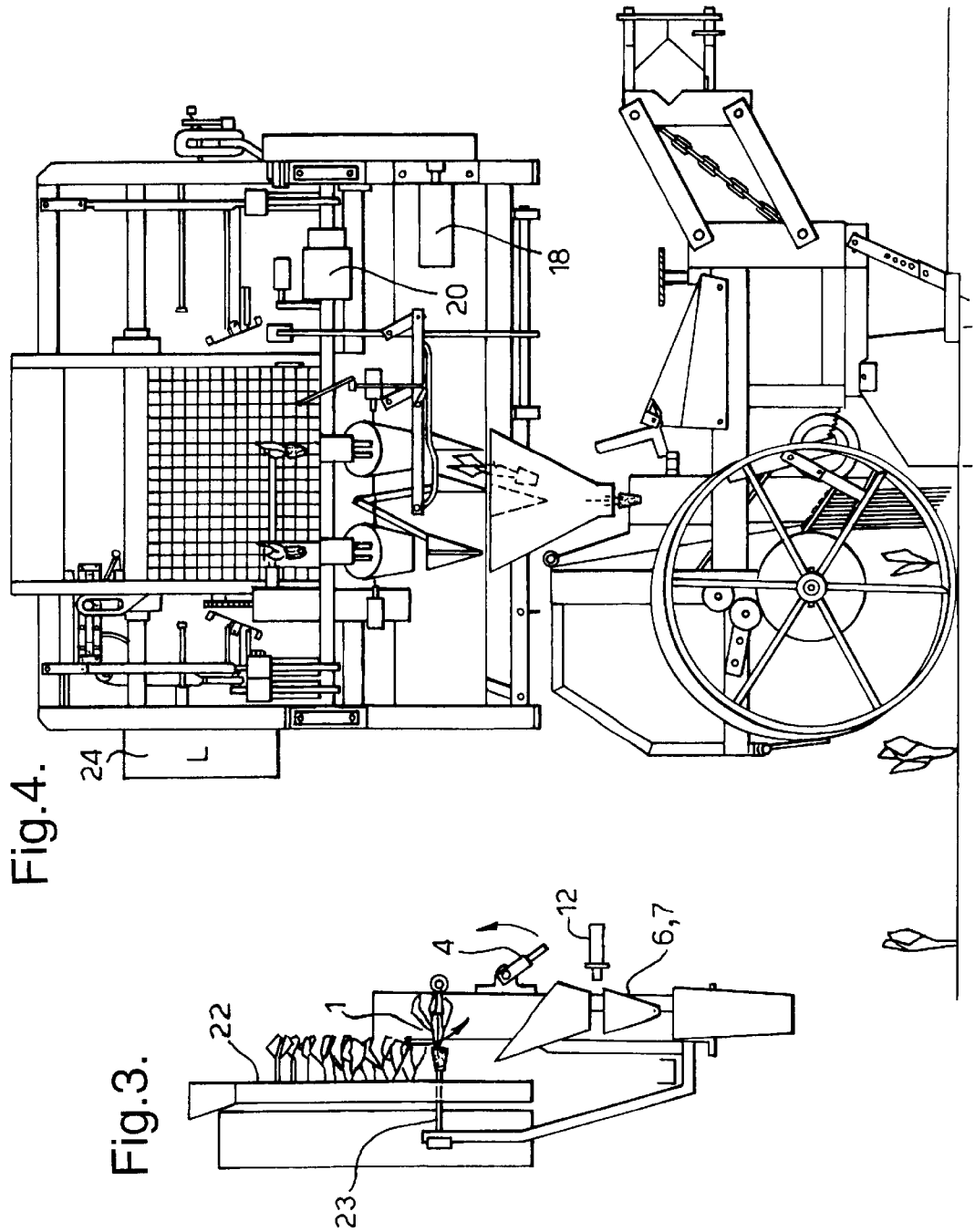

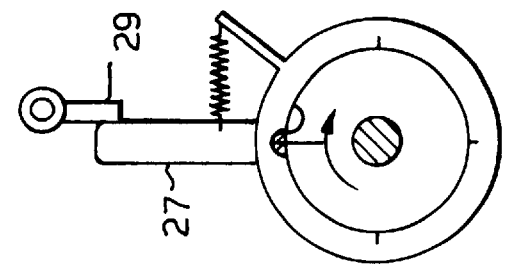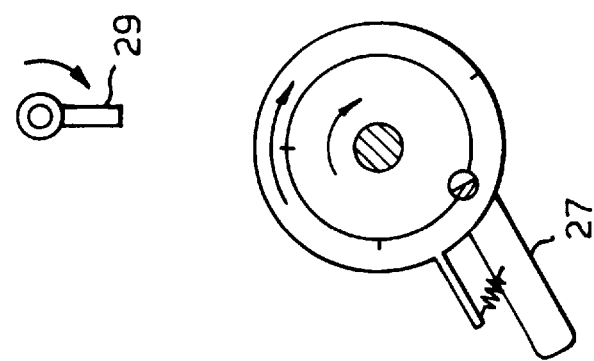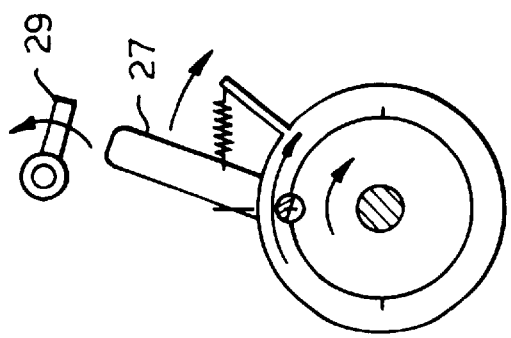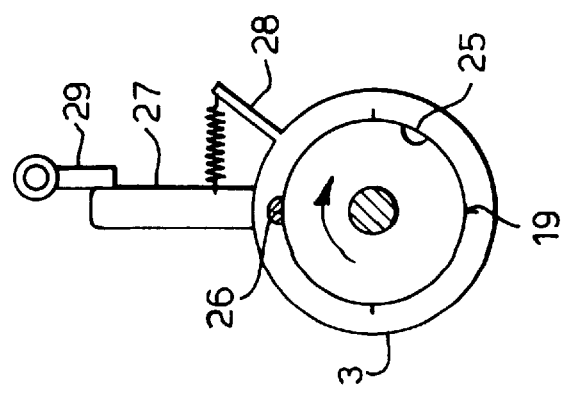

METHOD AND DEVICE FOR IMPROVING THE TRANSPLANTING OF SEEDLINGS

FIELD OF THE INVENTION

The present invention relates to a method and device for rendering the transplanting of bail seedlings more effective. More particularly, the invention relates to a method for eliminating balls without seedlings, and to a device for said purpose.

BACKGROUND OF THE INVENTION

In the cultivation of plants, e.g. vegetables, with balled seedlings, the aim is to obtain a complete stand of plants in the field. For various reasons, after the germination stage the seedling trays usually contain a number of balls without seedlings. These deficient balls were earlier sorted out manually before mechanical transplanting, or alternatively they were replaced with seedling-carrying balls following transplanting. In practice, the consequence of this is that the planting process is semiautomatic, whereby an operator supplies the machine only with seedling-carrying balls. Alternatively, automatic transplanting is first used, whereby the deficient balls are set in the ground and a person walking behind the machine manually replaces the deficient balls with seedling-carrying ones. This partly eliminates the economical benefit gained by the use of a continuously operating transplanting machine. If sorting or replacement is not carried out, the result is a patchy field and crop losses.

Japanese patent application 8-103112 discloses a device for removal of deficient seedling balls and replacement with seedling-carrying balls during automatic transplanting. The device is provided with a seedling feed unit wherein seedling balls are transferred to a carousel-type observation device, where individual balls are tested for the presence of a seedling using a detector. If the seedling is found absent, a replacement seedling is directed into the planting chute from a separate replacement seedling supply device.

Japanese patent application 8-112012 discloses a transplanting device, where seedling balls are fed from a cultivating tray for automatic transplanting, balls are tested by means of a detector, and when a seedling is found absent, a replacement seedling is extracted from a second, adjacent tray by means of a parallel mechanism.

SUMMARY OF THE INVENTION

An improved method is provided for removal of seedling balls lacking seedlings, having undersize seedlings or being otherwise deficient, and for their replacement with seedling-carrying balls during operation of an automatic transplanter. According to this method, at least two balls are simultaneously extracted from the same cultivation tray, which balls are subjected to detectors. If a seedling is absent in a ball, the deficient ball is discarded and another ball, which has been simultaneously extracted, is planted in place of the rejected one. The occurrence of extended spaces between seedlings in the field as deficient balls have been detected and discarded, is avoided by momentarily speeding up the seedling feed rate.

Thus, an deficient ball will be planted only in the case where all of the simultaneously extracted balls are deficient. The probability for such a case is not very large.

Preferably, two seedlings are simultaneously extracted from the tray, whereby the mechanical structure of the device remains fairly uncomplicated while the rate of deficient balls being planted normally stays within acceptable limits.

Also disclosed is a device for implementing the method according to the invention, having means for extraction of balls from a cultivating tray in a manner according to the prior art, and for bringing said balls into position for detection. Detectors are simultaneously targeted to a set of seedling balls that have been simultaneously extracted. Depending on the result of the measurement, deficient balls are discarded without disturbing the transplanting process, and the rate of extracting balls from the cultivation tray is increased in order to provide a uniform feeding rate of seedlings to the transplanting device.

It is characteristic for the method, that there is no need for a separate supply of replacement seedlings, but by extracting several seedlings simultaneously from the same tray, a sufficient probability is reached for obtaining proper seedlings during each extraction cycle. Moreover, the seedlings are not squeezed or otherwise vigorously treated in the course of the process.

BRIEF DESCRIPTION OF THE DRAWINGS

FIG. 3 is a side view of a detection device according to the invention;

FIG. 4 is a representation of the device of FIG. 1 adapted to a prior art automatic transplanter, and FIG. 5 shows the coupling mechanism for regulating the feed rate according to the detection of deficient seedlings, in its various stages of operation.

DESCRIPTION OF THE PREFERRED EMBODIMENTS

Preferred embodiments of the device of the present invention are described below, with reference to the enclosed drawings.

The seedling balls may be automatically separated from the cultivating trays in a known manner set forth in U.S. Pat. No. 4,893,571, hereby incorporated by reference. According to said method, the ball is removed by means of a pusher acting through an opening at the bottom of each cell of the cultivation tray. The ball is thereby imposed on a two-pronged receiving fork on the opposite side of the tray, the prongs penetrating the ball on both sides of the seedling.

Figure 1:
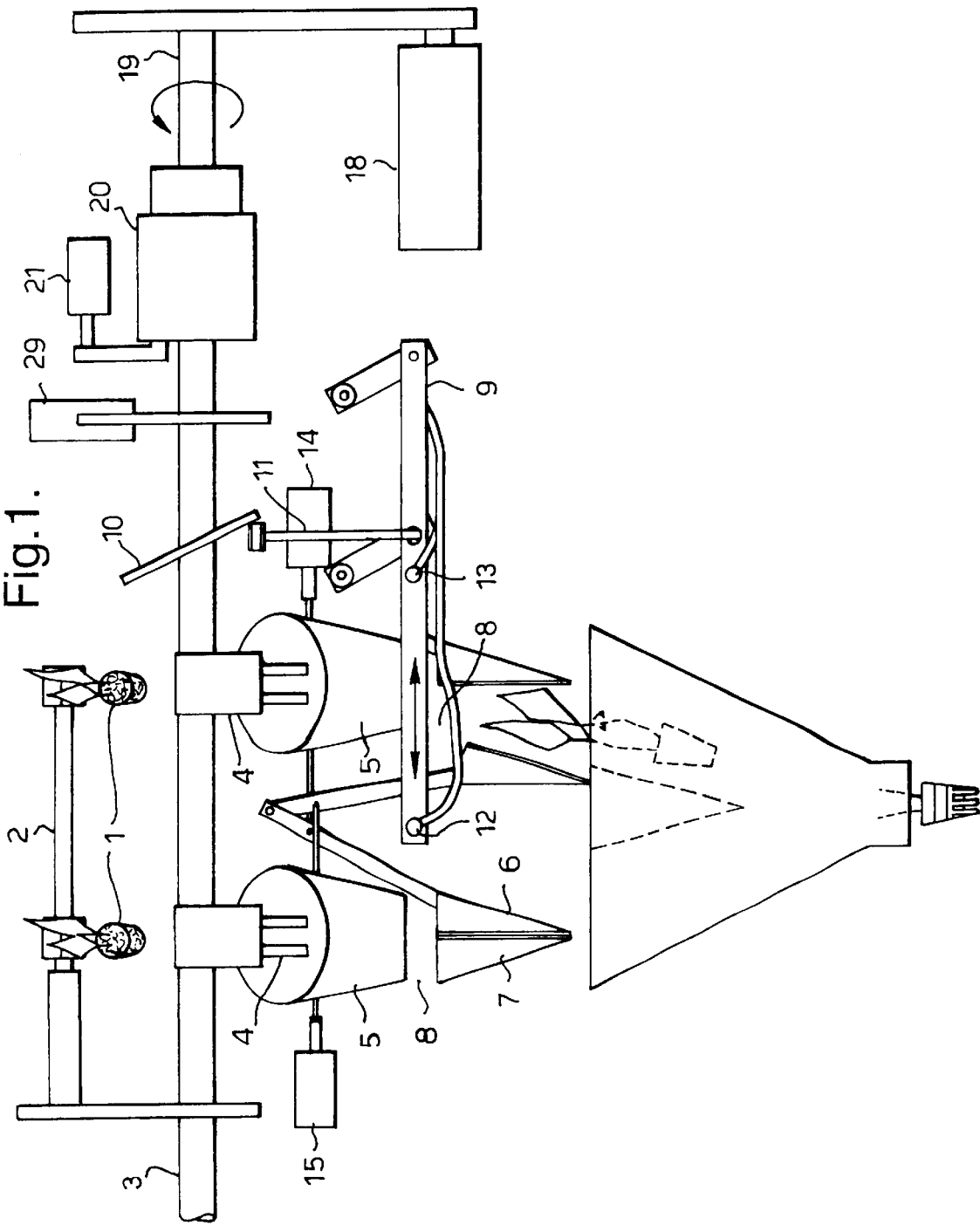
FIG. 1 is a representation of an embodiment of a device according to the invention, providing for simultaneous handling of two seedlings.

The device according to the invention shown in FIG. 1 is provided with two pushers acting simultaneously, adapted at the same row of the tray and at an internal distance corresponding to a multiple of the space between cells in the tray. If the tray has, for example, ten cells in a row, extraction of seedling balls is started from cells one and six, and the distance between the pushers, mounted on a common lever, corresponds to five cell widths. The tray is positioned on its edge, and the seedlings are thus in a horizontal position.

The receiving forks (1) (having imposed seedling balls in FIG. 1) are adapted to a common shaft (2), and as said shaft rotates 90°, the seedlings are brought into a vertical position. Detachment members (4), adapted to a shaft (3) working in synchronization, serve to remove the seedling balls from the receiving forks, whereby the balls fall through alignment funnels (5) into conical compartments comprising pairs of jaws (6,7). Gaps (8) are provided between the conical compartments and the alignment funnels, and the compartments are sized to retain the ball in a position where the seedling, if present, is visible in said gap. An oscillating arm (9) is adapted for synchronous movement with shaft (3), the skewed disc (10) fitted to shaft (3) acting on lever (11). Detectors (12,13) for each seedling are fitted o oscillating arm (9). Preferably, a transmitter-receiver combination type photoelectric cell sensor is used, reacting on reflections. For this type of sensor to operate reliably, it is preferable that the gap is as open as possible, in order to avoid stray reflections. Objects farther away in the background can be kept outside the working range of the sensor by adjusting the sensitivity of said sensor.

As arm (9) swings back and forth, seedlings visible in gaps (8) come within the detection range of the sensors. The sensor outputs are directed to a programmable logic unit (not shown in FIG. 1), programmed to open jaws (6,7) by means of signals directed to solenoids (14,15).

Figure 2:
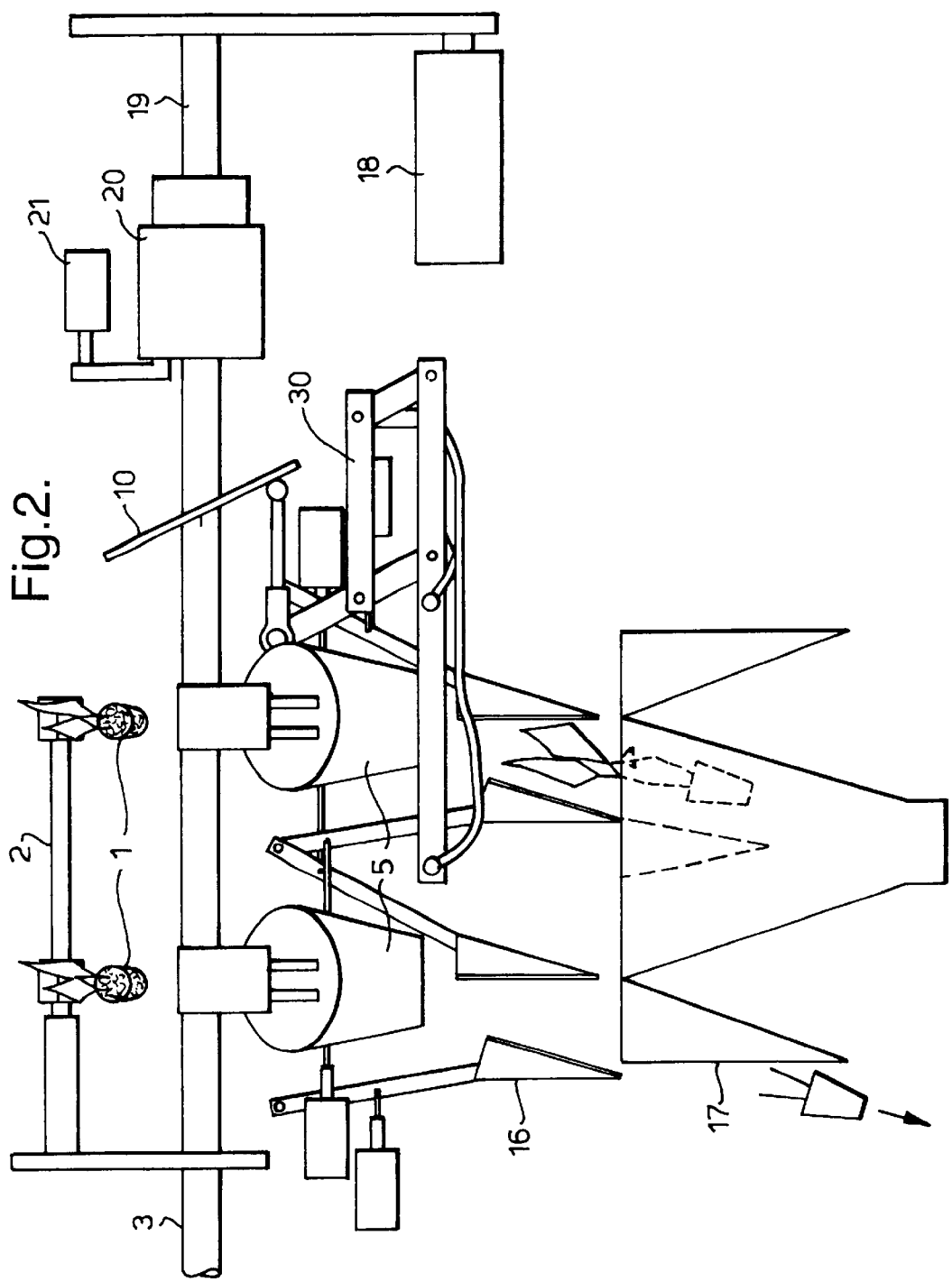
FIG. 2 is a representation of another embodiment of a device according to the invention.

In FIG. 1, the jaw pairs comprise a fixed jaw (7) and a movable jaw (6). If the absence of a seedling is detected in either seedling ball under observation, jaw (6) is opened under the control of the logic unit, and the deficient ball is discarded. As the movable jaw is opened, the deficient ball leaves by the same route by which a proper ball is planted. Whether this is acceptable or not depends on the working principle of the transplanting members of the relevant machine. If the deficient ball causes a disadvantage, another movable jaw (16) may be used according to FIG. 2. As jaw (16) is opened, the deficient ball is directed away by a route (17) separate from that of a ball due for transplanting. FIG. 2 also shows an alternative mechanism (30) for supporting and moving the detectors.

Control of the operation of the device and the synchronization of movement of the various parts can be accomplished by mechanical and/or electrical means. The logic unit referred to above receives input from the detectors, and outputs signals controlling the opening of the aforementioned jaws and the speed of the feeding mechanism in a manner set forth below.

The rate of feeding seedlings to the detection position is preferably controlled as follows, with reference to FIG. 1. Motor (18) drives shaft (19), the rotation of which is continuous. Coupling (20) operates intermittently under the control of solenoid (21), causing shaft (3) to rotate one revolution for every second revolution of shaft (19). Two seedling balls are extracted for every revolution of shaft (3). The seedling balls having dropped in between jaws (6,7), the sensors fitted to oscillating arm (9) scan their detection range a set forth above. The oscillating movement of arm (9) is provided by disc (10) fitted through its center to shaft (3) in an inclined position, acting on the end-bearing of lever (11), and by a return spring not shown in the figure. If seedlings are detected in both compartments, the logic unit, by means of solenoid (21) acting on coupling (20), causes shaft (3) to stop for one revolution of shaft (19). During this period of one revolution, solenoids (14,15) controlled by the logic unit cause jaws (6) to open sequentially, whereby both seedlings will be planted.

In the case where either ball lacks a seedling, the logic unit controls solenoid (21) so as to keep shaft (3) rotating, whereby two new seedling balls are provided in the detection compartments during the following revolution of shaft (3). Before that, the deficient ball has been swiftly discarded and the other ball from the same extraction cycle has been planted. Preferably, shaft (3) is provided with a brake mechanism (29) to ensure proper, intermittent operation. The brake may be a simple disc brake enabling standard adjustment, and having varying disc thickness to ensure that the shaft will stop in the right position; it may be an electromechanical brake controlled by the logic unit, or some other type of device based on, e.g., the action of an eccentric member and spring load, as a person skilled in the art may contemplate.

FIG. 3 shows a side view of the device of FIG. 1. The seedling balls are in tray (22), from which pushers (23) remove two balls at a time. By means of receiving forks (1), detachment members (4) and funnels (5), the balls are transferred to the conical compartments formed by jaws (6,7), and seedlings can be registered in gap (8) by detectors (12), as set forth above.

FIG. 4 shows the device of FIG. 1 adapted to a transplanting machine according to U.S. Pat. No. 4,893,571. Item (24) represents the programmable logic unit for controlling operation.

The coupling (20) between shafts (19) and (3) may advantageously be designed as shown in FIG. 5, which depicts a section of the coupling, viewed axially along the shafts at different stages of operation. The continuously rotating shaft (19) is represented by the inner circle as shown. At the location of the coupling, a longitudinal groove (25) is provided in shaft (19). The outer circle represents the intermittently stopping shaft (3). Thereto is adapted an interlocking mechanism comprising a rod (26), parallel with the shaft and having a halfcircular cross section, and a lever (27) extending radially from the shaft. Lever (27) is connected to bracket (28) of shaft (3) by means of a spring.

Latch (29) of solenoid (21, FIG. 1) being in its lower position, lever (27) sets the flat side of rod (26) in a position where shaft (19) may rotate freely while shaft (3) is stationary (FIG. 5a). As latch (29) opens, the spring pulls lever (27) to turn rod (26) in order to engage groove (25) as this comes into position, causing the inner and outer shafts to interlock and rotate as a unit (FIG. 5b).

While the shafts rotate together (FIG. 5c), latch (29) may return to its lower position, engaging lever (27) when the shafts have finished a full revolution. Thereby rod (26) turns free of groove (25), the outer shaft stops and the inner shaft continues rotating (FIG. 5d).

Synchronization of operation of the various parts of the device is based on the rotation of shaft (19). The rotating speed is controlled according to the speed of the transplanting machine relative to the field, in order to maintain a uniform distance between seedlings. The control method may be based upon vehicle radar or pulse sensor technology in a manner well known to those skilled in the art, or naturally on manual control. Shaft (19) also provides power to the transfer mechanism according to U.S. Pat. No. 4,893, 571 as described above, and to the seedling extraction mechanism. Preferably, a synchronizer disc is mounted to shaft (19), providing information to the logic unit on the rotation of the shaft by means of a sensor acting on said disc. Thus, activation of detectors (12,13) can be controlled by the logic unit to occur at the exact moment according to the rotational position of shaft (19), leading to planting of one seedling per revolution of shaft (19).

In the embodiments described, the seedling detectors are adapted to move relative to the seedlings, which is advantageous when optical sensors are used. The invention is not limited to optical sensors, but also e.g. laser or ultrasound sensors, capacitive sensors or color-sensitive sensors may be adapted to a device according to the invention. The movement of detectors and seedlings relative to each other is not a prerequisite by all sensor types, and there are cases where oscillating mechanism (9,11,10) can be eliminated, and the detectors be fixedly mounted at gaps 8.

A person skilled in the art may naturally use other technical means than those explicitly disclosed herein for implementing, for example, coupling (20), brake (29), detectors (12,13) and the control of the various components of the device, without departing from the inventive principle as defined by the claims.

What is claimed is:

1. A method for removal of balls carrying no seedlings or undersize seedlings, or otherwise deficient seedling balls, and for the replacement of said balls with balls carrying proper seedlings during automatic transplanting, comprising the steps of
   a) simultaneously extracting at least two seedling balls from a seedling cultivation tray with detachment members attached to a first shaft, the first shaft being coupled to a second shaft by a coupling the second shaft being driven by a motor,
   b) detecting whether the balls have seedlings by means of at least two signal-providing sensors,
   c) if a signal generated in stage b) indicates one of the balls does not have a seedling, removing the ball not having a seedling,
   d) planting another ball of those simultaneously extracted in stage a)
   e) compensating for a deficit caused by a discarded ball by temporarily increasing a rate of feeding balls from said cultivation tray by temporarily deactivating the coupling to increase a relative rotational speed between the first shaft and the second shaft.

2. A method as defined in claim 1, wherein in the extracting step two seedling balls are extracted simultaneously from the cultivation tray, and the feeding rate is doubled following removal of a rejected seedling ball.

3. A device for removal of balls carrying no seedlings and replacement of said balls with balls carrying proper seedlings during automatic transplanting, comprising means for simultaneous extraction of at least two seedling balls from a common cultivation tray, means for detection of seedlings in said at least two seedling balls, means for removing a rejected seedling ball and for directing an accepted seedling ball for transplanting and means for increasing a feeding rate of seedling balls following removal of a rejected ball.

4. A device as defined in claim 3, comprising means for extraction of two seedling balls from a common cultivation tray and for detection of seedlings carried by said two seedling balls, and means for doubling the feeding rate from the seedling cultivation tray following removal of a rejected seedling ball.

5. A device as defined in claim 3, wherein the means for detecting seedlings comprise photoelectric sensors movable relative to the seedlings during detection.

6. A device as defined in claim 3, wherein the means for increasing the feeding rate comprise a first rotational shaft, a second rotational shaft and an electrically controllable coupling between said shafts.

7. A device as defined in claim 3, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

8. A device as claimed in claim 4, wherein the means for detecting seedlings comprise photoelectric sensors movable relative to the seedlings during detection.

9. A device as claimed in claim 4, wherein the means for increasing the feeding rate comprise a first rotational shaft, a second rotational shaft and an electrically controllable coupling between said shafts.

10. A device as claimed in claim 5, wherein the means for increasing the feeding rate comprise a first rotational shaft, a second rotational shaft and an electrically controllable coupling between said shafts.

11. A device as claimed in claim 8, wherein the means for increasing the feeding rate comprise a first rotational shaft, a second rotational shaft and an electrically controllable coupling between said shafts.

12. A device as defined in claim 4, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

13. A device as defined in claim 5, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

14. A device as defined in claim 6, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

15. A device as defined in claim 8, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

16. A device as defined in claim 9, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

17. A device as defined in claim 10, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

18. A device as defined in claim 11, comprising an electronic programmable unit for controlling the synchronized operation of the means for detection, the means for removal of rejected seedling balls and direction of accepted seedling balls for transplanting, and the means for increasing the feeding rate of seedling balls following removal of a rejected seedling ball.

* * * * *